(12) United States Patent
Beckmann et al.

(10) Patent No.: US 12,028,497 B1
(45) Date of Patent: Jul. 2, 2024

(54) SIMULTANEOUS SINGLE OBVERSE AND REVERSE IMAGING OF COLLECTIBLE ITEMS

(71) Applicant: Certified Guaranty Company, LLC, Lakewood Ranch, FL (US)

(72) Inventors: Jonathan D. Beckmann, Sarasota, FL (US); Max T. Hall, Bradenton, FL (US); Edwin J. Sarver, Cookeville, TN (US)

( * ) Notice: Subject to any disclaimer, the term of this patent is extended or adjusted under 35 U.S.C. 154(b) by 0 days.

(21) Appl. No.: 18/352,239

(22) Filed: Jul. 13, 2023

Related U.S. Application Data

(60) Provisional application No. 63/503,712, filed on May 22, 2023.

(51) Int. Cl.
| | |
|---|---|
| *H04N 1/203* | (2006.01) |
| *B25J 9/00* | (2006.01) |
| *B65G 47/91* | (2006.01) |
| *G03B 15/03* | (2021.01) |
| *G03B 15/06* | (2021.01) |
| *G03B 15/12* | (2021.01) |
| *G03B 27/54* | (2006.01) |
| *G03B 27/62* | (2006.01) |

(52) U.S. Cl.
CPC .......... *H04N 1/2034* (2013.01); *B25J 9/0093* (2013.01); *B65G 47/914* (2013.01); *G03B 15/03* (2013.01); *G03B 15/06* (2013.01); *G03B 15/12* (2013.01); *G03B 27/54* (2013.01); *G03B 27/6264* (2013.01); *B65G 2201/0235* (2013.01); *B65G 2203/041* (2013.01)

(58) Field of Classification Search
CPC .............. G03B 27/62–64; G03B 15/12; H04N 1/1959; H04N 1/2034
USPC .......................................................... 355/23
See application file for complete search history.

(56) References Cited

U.S. PATENT DOCUMENTS

| | | | | |
|---|---|---|---|---|
| 2,367,673 | A | * | 1/1945 | Fassel .................... G03B 27/50 355/24 |
| 2,436,103 | A | * | 2/1948 | Egan ................... G03B 27/6257 355/71 |

(Continued)

FOREIGN PATENT DOCUMENTS

| | | | |
|---|---|---|---|
| FR | 1043639 | * | 11/1953 |

OTHER PUBLICATIONS

"Coin Talk—ASE Proof Discussion", Sep. 15, 2016, 15 pages.

*Primary Examiner* — Leon W Rhodes, Jr.
(74) *Attorney, Agent, or Firm* — Patent GC LLC; Alexander Franco

(57) ABSTRACT

An imaging system is configured to capture images of both obverse and reverse sides of a collectible item using a single image captured by a single camera. The reflective faces of two flat mirrors are positioned at a 90-degree angle, and a collectible item is positioned and secured between the mirrors such that parallel faces of the item or its case are oriented at a 45-degree angle between the flat mirrors. A camera is mounted to face the mirrors with its perspective being parallel to the faces of the item, looking into the mirrors. The camera can see mirrored reflections of both faces of the item simultaneously from a single perspective and can capture views of both faces in a single camera image. The single image can then be cropped and reverse-mirrored automatically or manually in software to extract images of the obverse and reverse sides of the item.

20 Claims, 22 Drawing Sheets

(56) References Cited

U.S. PATENT DOCUMENTS

| | | | |
|---|---|---|---|
| 4,183,662 A * | 1/1980 | Bloemendaal | G03B 27/6264 |
| | | | 271/226 |
| 5,936,725 A | 8/1999 | Pike et al. | |
| 10,168,384 B2 * | 1/2019 | Mardi | B25J 11/0095 |
| 10,755,239 B1 * | 8/2020 | Haider | G03B 17/561 |
| 2014/0002634 A1 | 1/2014 | Karinen | |
| 2022/0036371 A1 * | 2/2022 | Frisbee | G06V 10/82 |
| 2023/0286020 A1 * | 9/2023 | Wright, III | B25J 15/0616 |
| | | | 209/587 |
| 2023/0325392 A1 * | 10/2023 | Kass | G06T 7/001 |
| | | | 382/112 |

\* cited by examiner

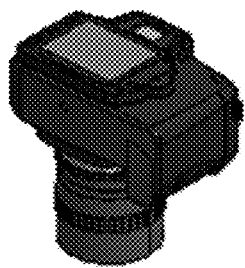
FIG. 1B
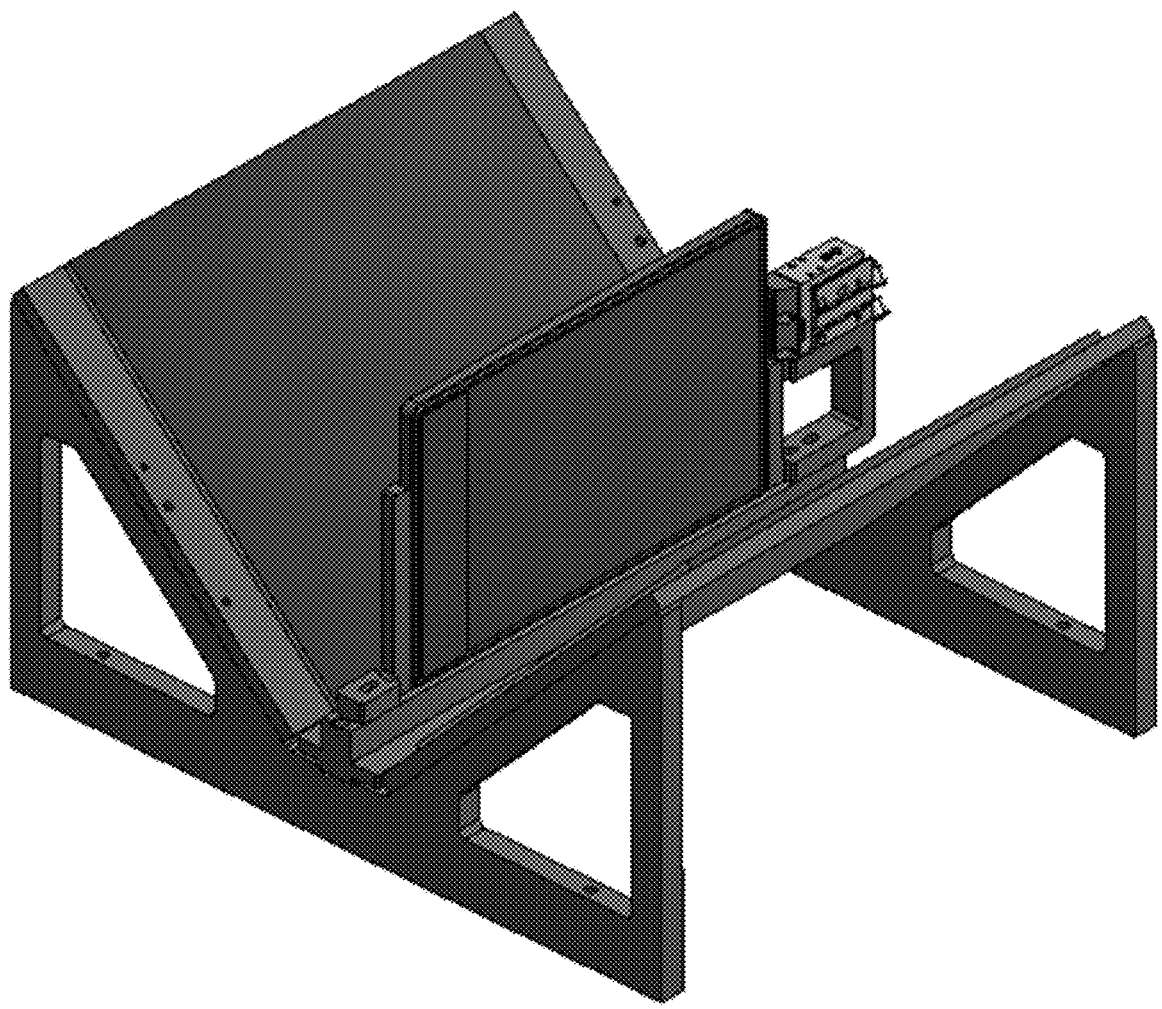

SIMULTANEOUS SINGLE OBVERSE AND REVERSE IMAGING OF COLLECTIBLE ITEMS

RELATED APPLICATIONS

The subject matter of this application is related to U.S. Provisional Application No. 63/503,712, filed on 2023 May 22, which is hereby incorporated by reference in its entirety.

BACKGROUND OF THE INVENTION

Comic books, trading cards, coins and other collectible items (any of which may also be referred to herein as a "collectible") are bought and sold over the Internet, at trade shows, and at collectible item dealer stores. There exist commercial services that authenticate, grade, and encapsulate such collectible items. A service typically encapsulates the item within a tamper-evident transparent plastic case with a certificate indicating a description and grade of the item. The service may also capture images of the encapsulated item from obverse and reverse sides for the benefit of the current or subsequent owners. The graded and encapsulated item, which is then returned by the service to its owner along with the images, becomes a more marketable item than one that is not graded, encapsulated, and imaged.

SUMMARY OF THE INVENTION

An imaging system is configured to capture images of both obverse and reverse sides of a collectible item using a single image captured by a single camera. The reflective faces of two flat mirrors are positioned at a 90-degree angle, and a collectible item is positioned and secured between the mirrors such that parallel faces of the item or its case are oriented at a 45-degree angle between the flat mirrors. A camera is mounted to face the mirrors with its perspective being parallel to the faces of the item, looking into the mirrors. The camera can see mirrored reflections of both faces of the item simultaneously from a single perspective and can capture views of both faces in a single camera image. The single image can then be cropped and reverse-mirrored automatically or manually in software to extract images of the obverse and reverse sides of the item. The simultaneous capture of both sides of the item in a single image makes imaging more efficient and avoids the need to associate multiple images captured by different cameras or at different times as being of the same collectible item.

A system simultaneously images opposing sides of a collectible for each of a plurality of collectibles. The system can include: a frame; two plane mirrors, each plane mirror having a flat reflective surface, the two plane mirrors attached to the frame in a configuration that forms a 90-degree angle between the reflective surfaces of the two plane mirrors; a holder attached to the frame and configured to secure the collectible between the two plane mirrors, the collectible being substantially centered on a geometric plane extending along a bisection of the 90-degree angle, wherein each of the opposing sides of the collectible forms a reflection in one of the plane mirrors; and a camera attached to the frame, the camera positioned with a field of view oriented towards the reflections formed in the two plane mirrors, the field of view being substantially centered within the geometric plane.

The system can further include at least two light sources attached to the frame, each light source positioned to illuminate the collectible directly and by reflection off at least one of the mirrors. Each of the at least two light sources can be positioned to provide light through one of two substantially triangle-shaped openings bounded by the two mirrors. The number of light sources can be four, and each of the four light sources can be positioned to provide light through one of four substantially triangle-shaped openings bounded by one of the mirrors and a side of the collectible. Each of the four light sources can be a triangularly shaped diffused light source. The at least two light sources may be positioned no closer to the camera than a closest portion of the collectible being imaged.

The system can further include a computer controlled robotic arm having an end effector configured for picking and placing collectibles. The end effector can include one or more actuatable suction cups. The end effector can include two sets of suction cups, wherein a first set of suction cups is configured for holding a first collectible and a second set of suction cups is configured for holding a second collectible.

The system can further include a conveyor from which collectibles are picked by the robotic arm for placement in the holder. The robotic arm can be configured to pick imaged collectibles from the holder after imaging and replace the imaged collectibles on the conveyor. The holder can include at least one pneumatically actuated clamping wall. The collectible may be a cased collectible item comprising an item and a transparent plastic case enclosing the item.

The system can further include a computer system comprising at least one processor and a memory storing instructions that cause the computer system to perform a method comprising: receiving an image captured by the camera; cropping from the image an obverse side image of the collectible; cropping from the image a reverse side image of the collectible; identifying the collectible based on a label on the collectible as captured within the image; and associating the cropped side images with the identification of the collectible.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

BRIEF DESCRIPTION OF THE DRAWINGS

FIGS. 1A-B are computer aided design (CAD) drawings showing two perspectives of an assembly for imaging both sides of a collectible with a single camera image.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

EXAMPLE EMBODIMENTS

Figure 1A:
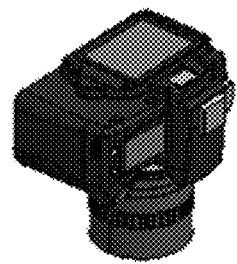
Figure 1A:
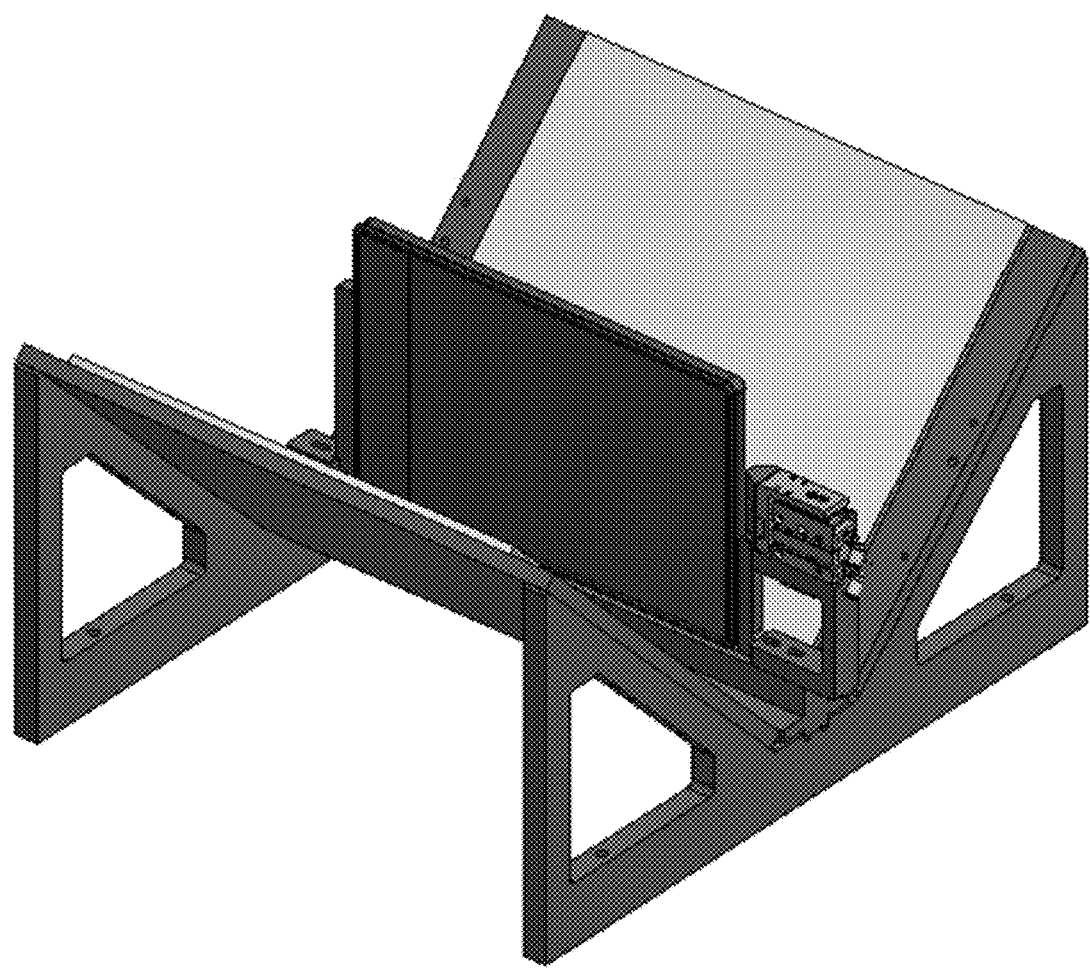

FIGS. 1A-B are computer aided design (CAD) drawings showing two perspectives of an assembly for imaging both sides of a collectible with a single camera image. Two mirrors are supported and secured within a frame such that there is a 90-degree angle between the reflecting surfaces of the two mirrors. The frame also supports a holder that releasably secures a collectible aligned in a geometric virtual plane that bisects the 90-degree angle between the reflecting surfaces. A camera is shown hovering above the collectible and is supported by a portion of the frame which has been omitted from the image for the sake of simplicity.

Figure 1C:
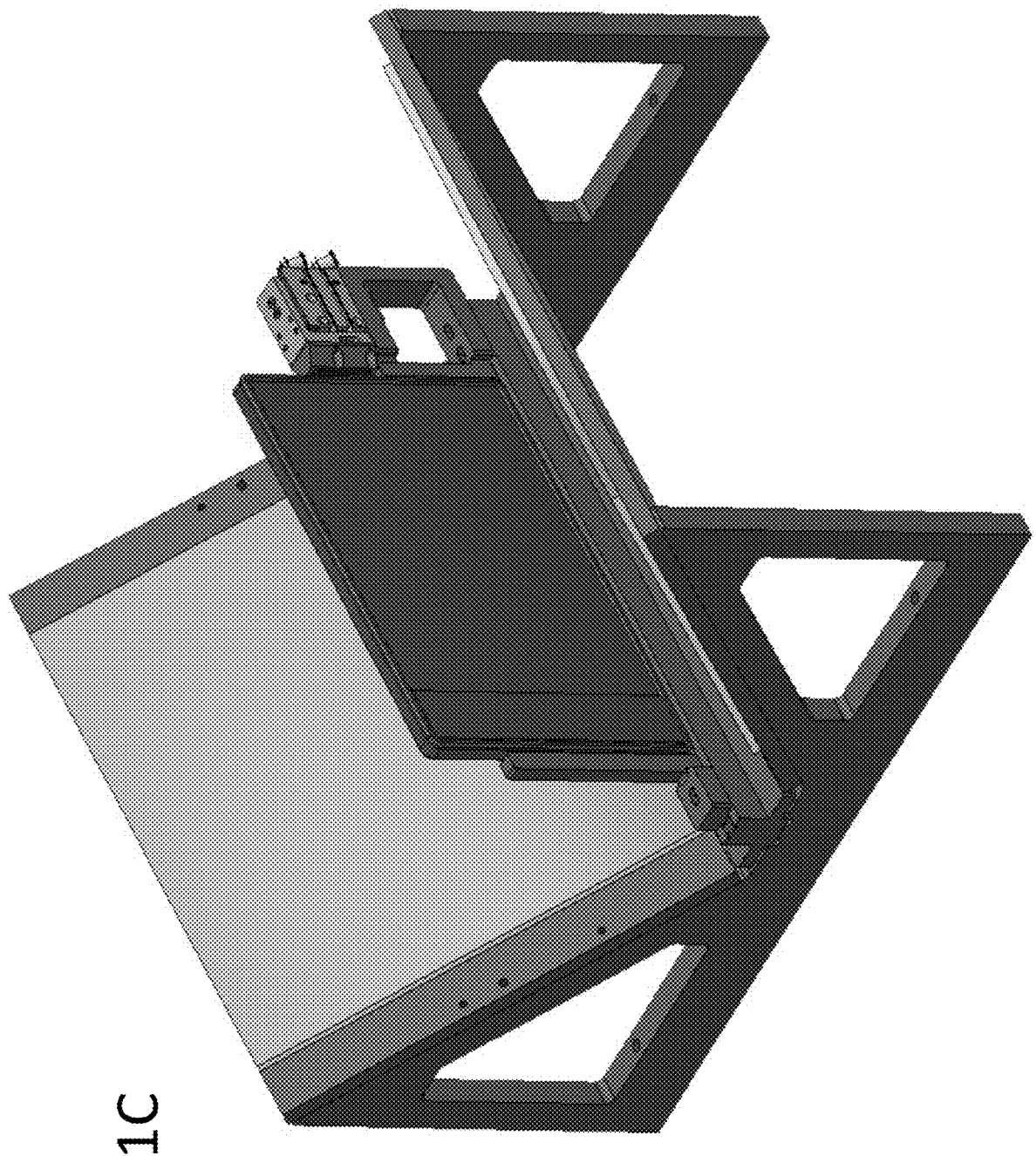
FIGS. 1C-D show additional perspectives of the assembly without the camera.
Figure 1D:
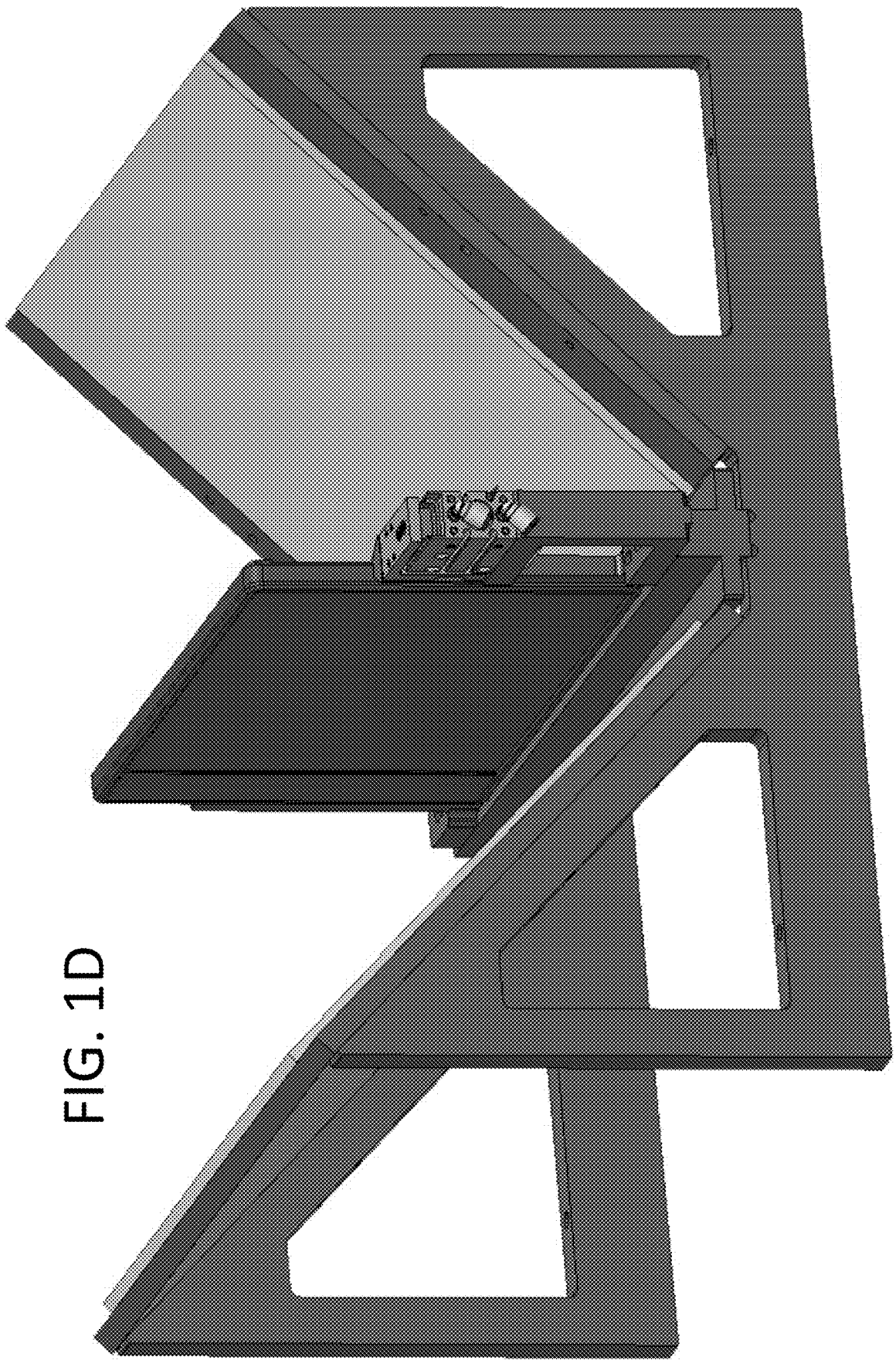

FIGS. 1C-D show additional perspectives of the assembly without the camera.

Figure 2:
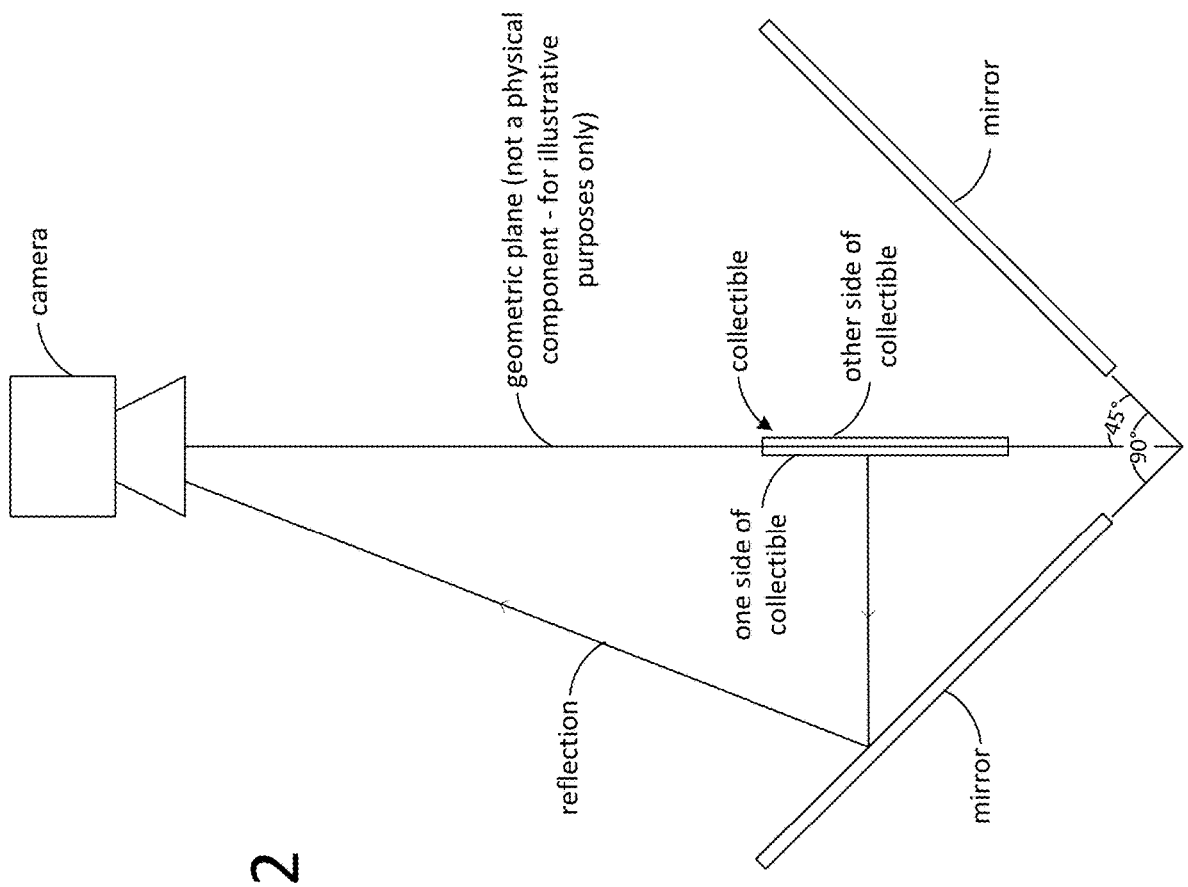
FIG. 2 illustrates a schematic of the configuration of the mirrors, the collectible, and the camera in accordance with one embodiment.
Figure 3A:
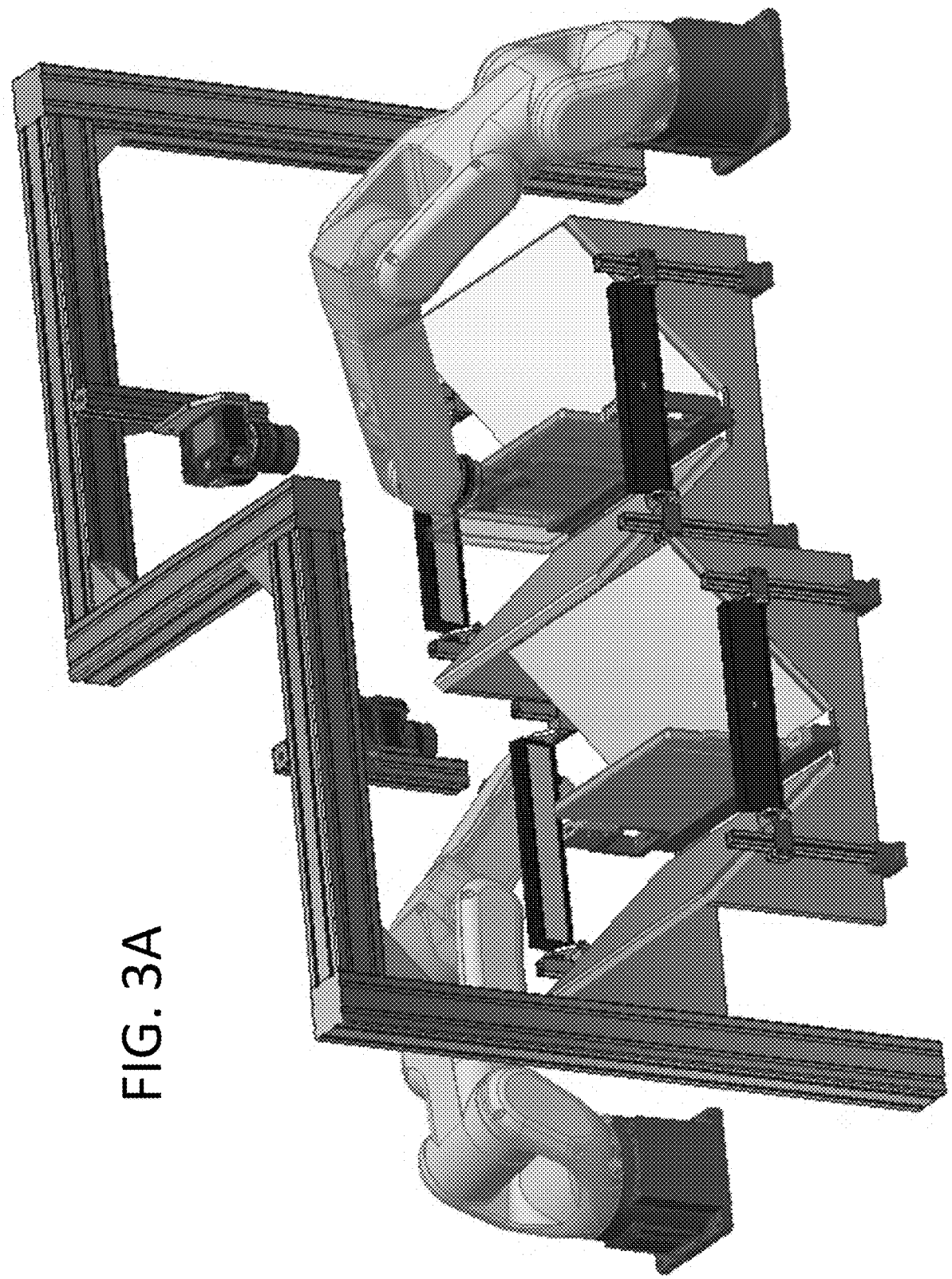
FIGS. 3A-F are CAD drawings from various perspectives showing a robotic system for imaging collectibles according to one embodiment.
Figure 3B:
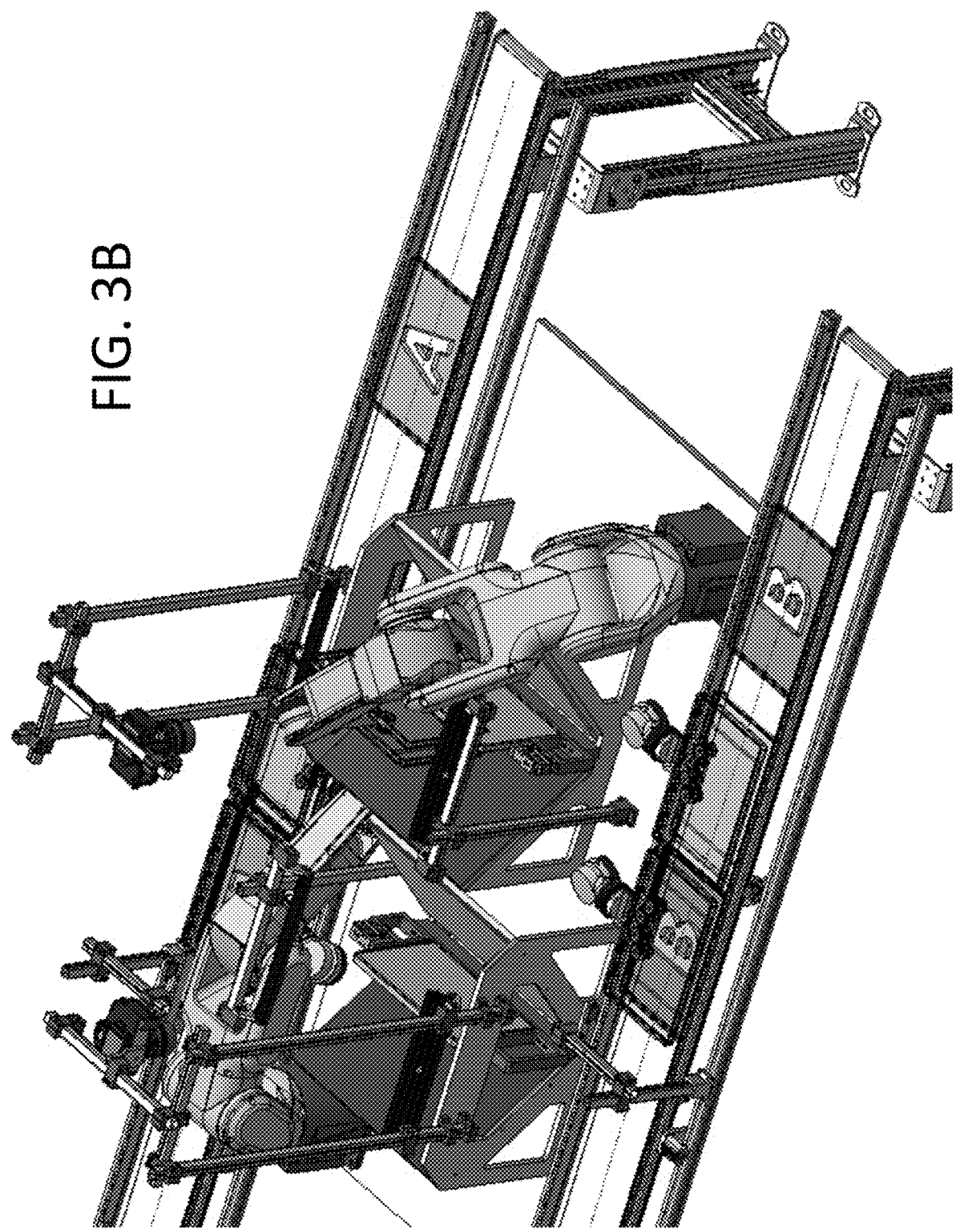
Figure 3C:
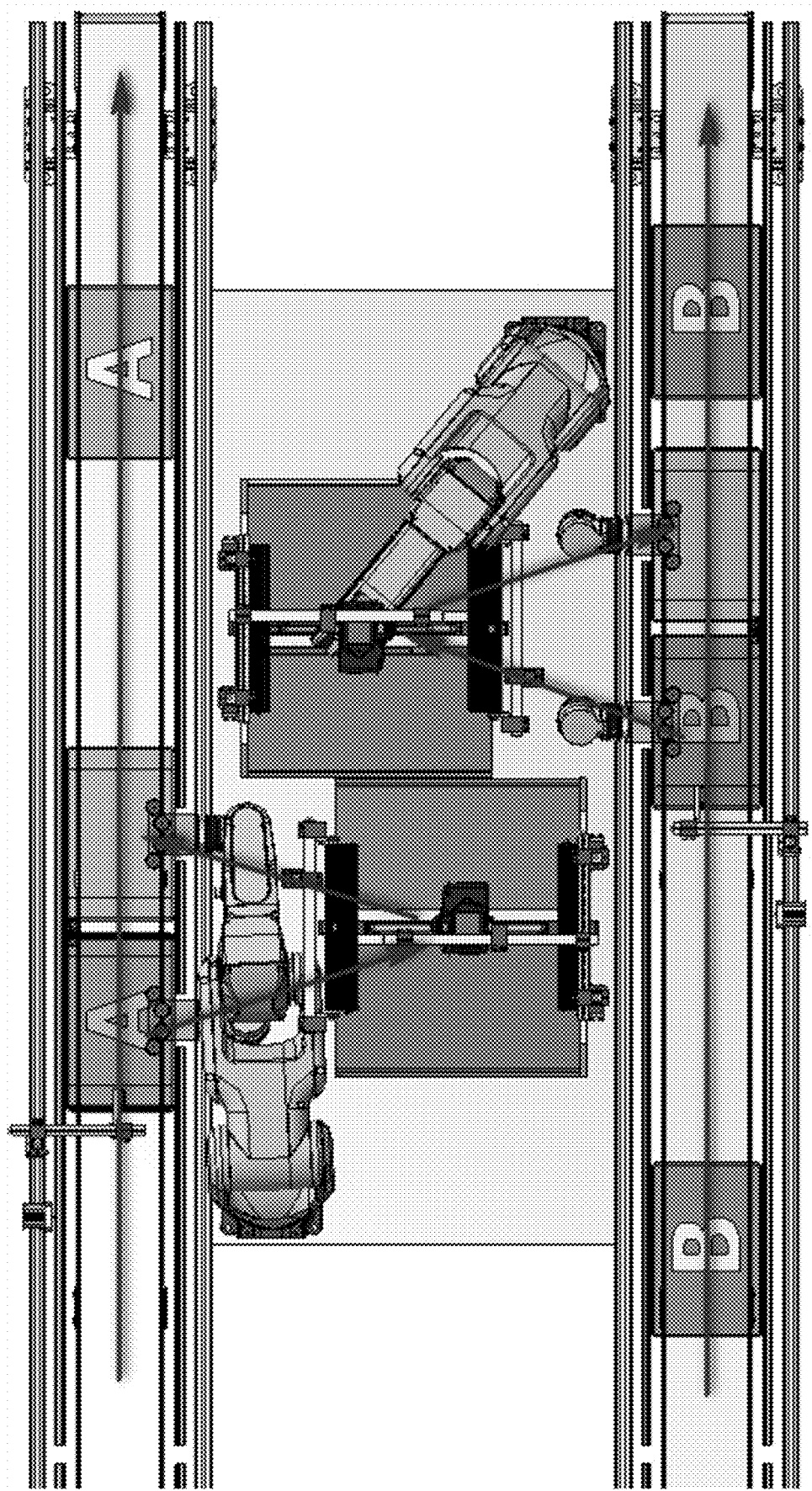
Figure 3D:
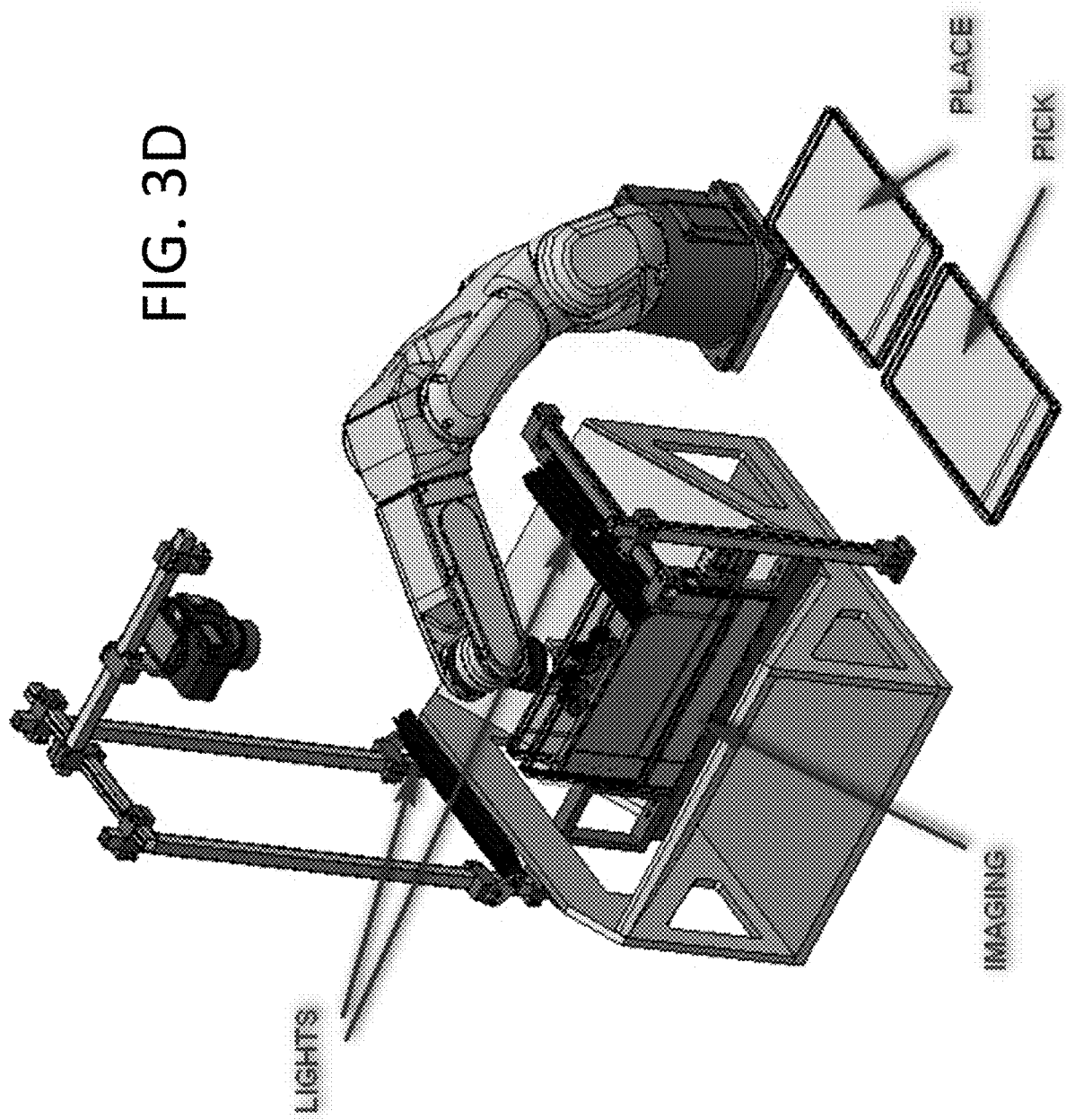
Figure 3E:
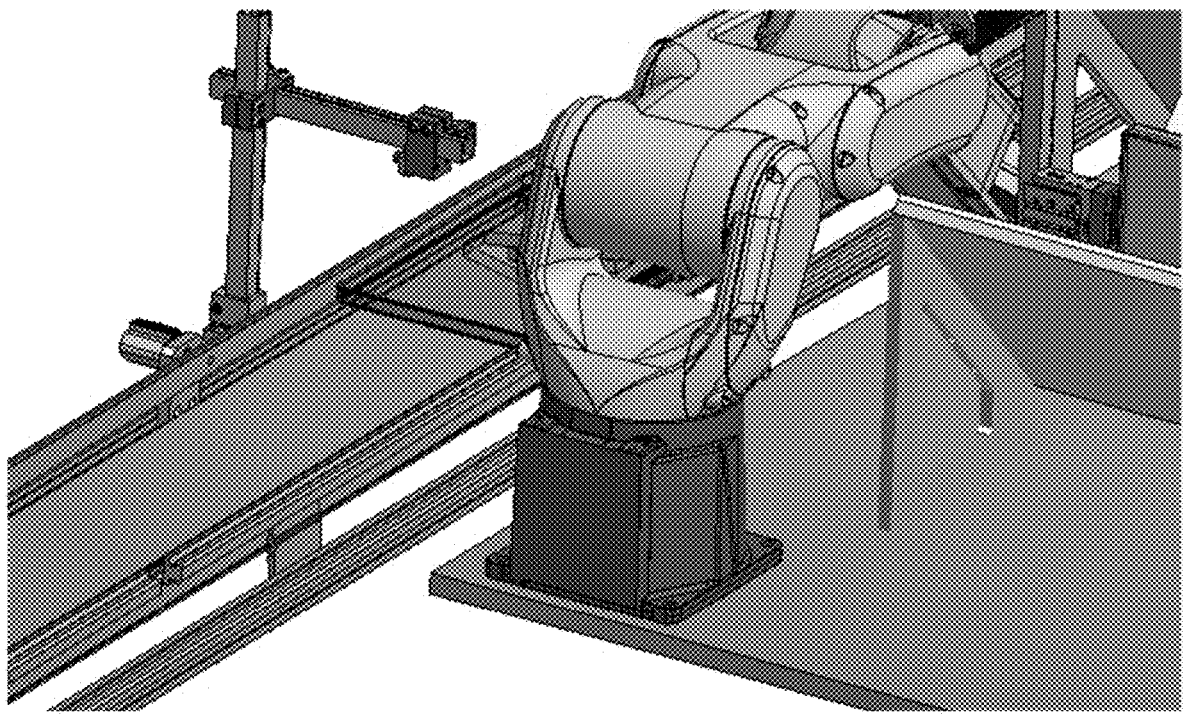
Figure 3F:
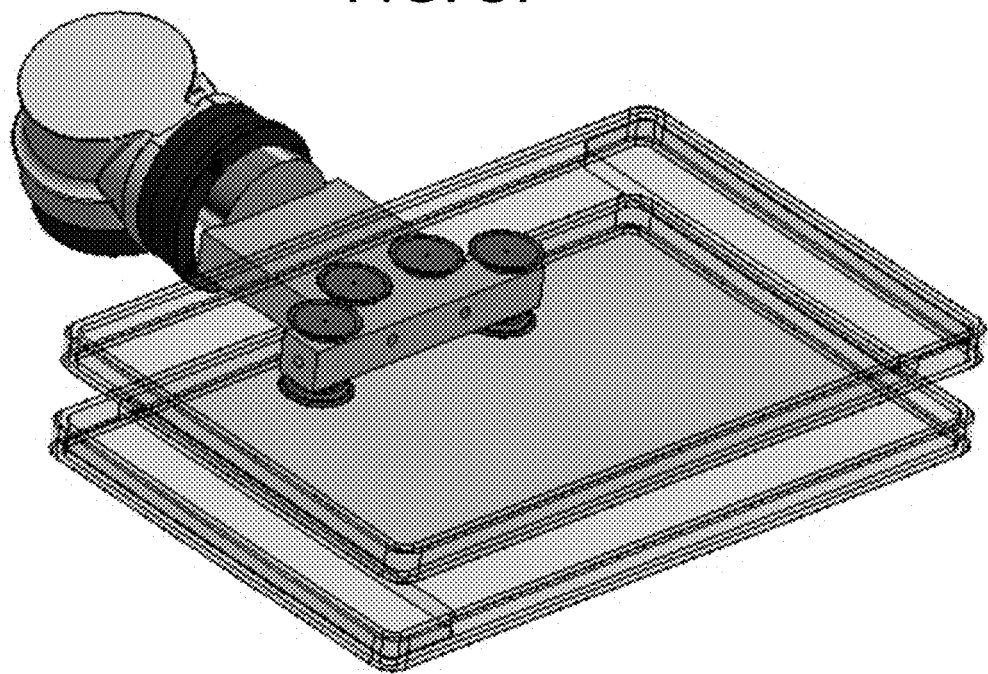

FIG. 2 illustrates a schematic of the configuration of the mirrors, the collectible, and the camera in accordance with one embodiment.

FIGS. 3A-F are CAD drawings from various perspectives showing a robotic system for imaging collectibles according to one embodiment. A robot arm uses suction cups to lift a cased collectible item off a conveyor belt and place it in a holder or stage between the mirrors before moving out of the camera's field of view. The holder can include a pneumatically actuated clamping mechanism to hold the collectible in place once it is placed by the robot arm and during imaging. Light sources to illuminate the collectible can be positioned to shine light through each of two triangular spaces that are formed between each face of the collectible item and a facing mirror. Once the image is captured, the robot can again grab the collectible using suction cups as it is released from the holder and can place another collectible in the holder for imaging.

In one embodiment, the robot arm is configured to hold an already imaged collectible with one set of suction cups and another yet to be imaged collectible with another set of oppositionally disposed suction cups so that the one collectible can be quickly replaced with the other with less movement of the robot arm.

Figure 4:
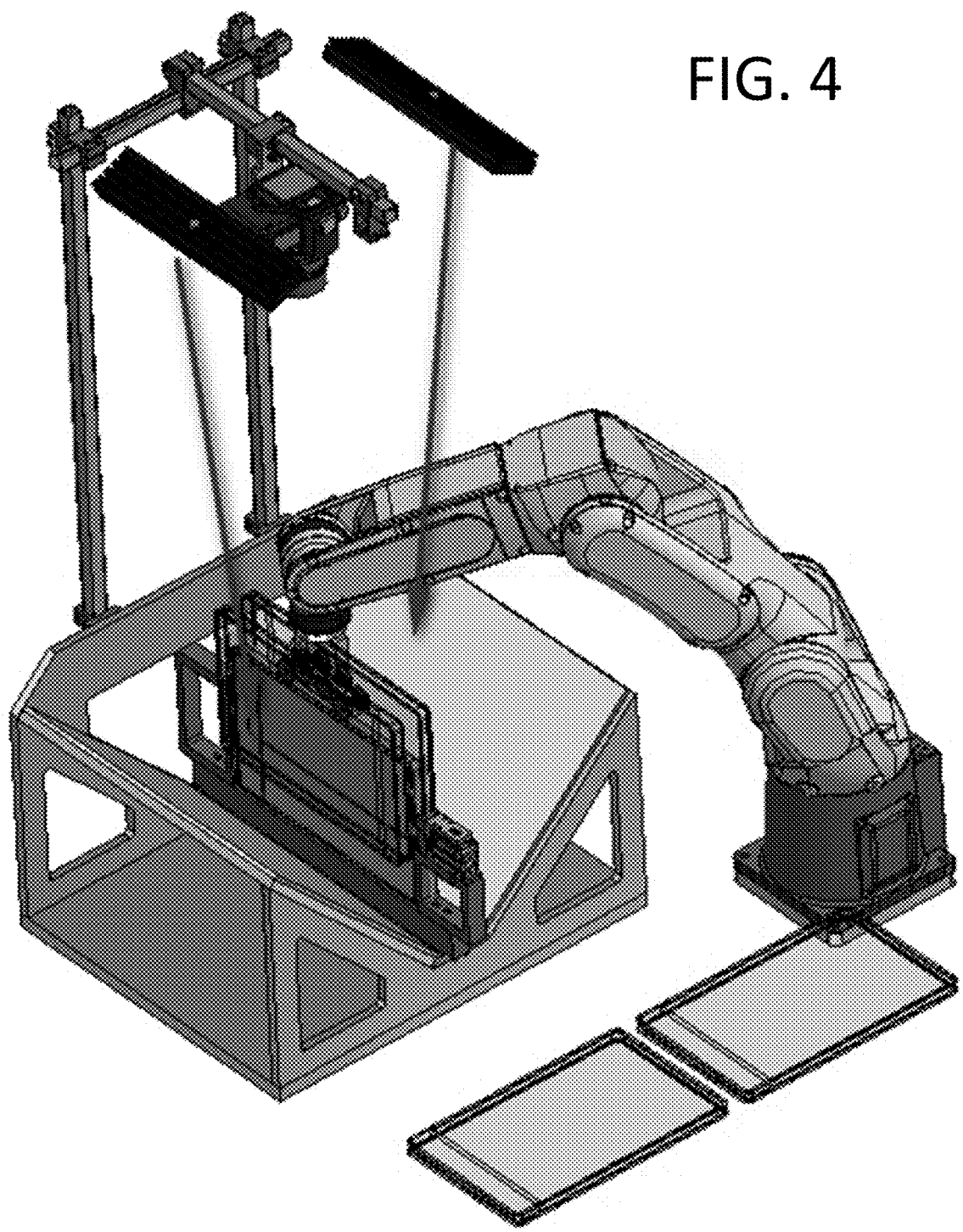
FIG. 4 is a CAD drawing showing a robotic system for imaging collectibles according to one embodiment.

FIG. 4 is a CAD drawing showing a robotic system for imaging collectibles according to one embodiment. The arrows in the image show the direction of light being projected by overhead lights which reflects off the mirrors to illuminate the collectible.

Figure 5A:
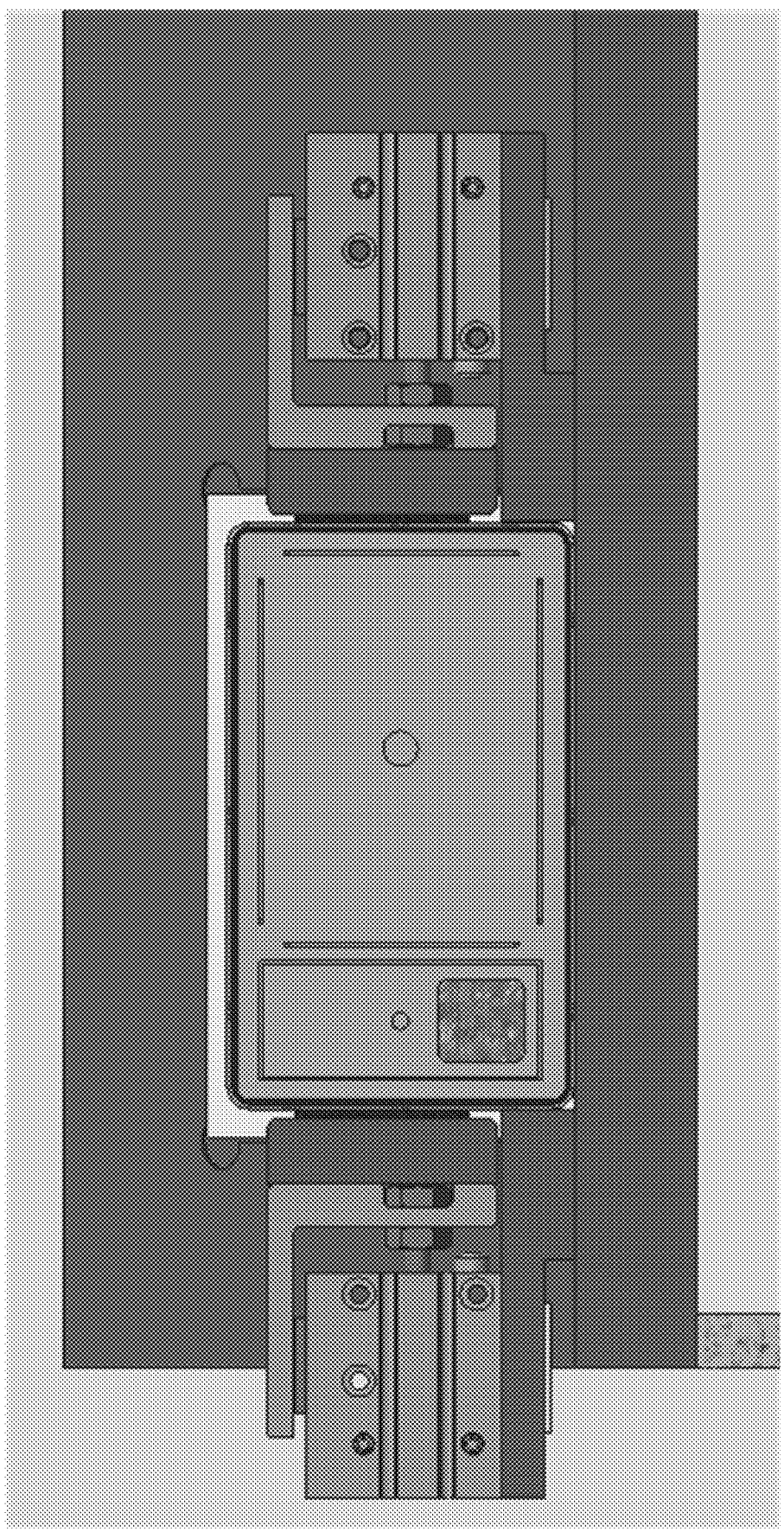
FIGS. 5A-B are CAD drawings showing two different embodiments of a holder.
Figure 5B:
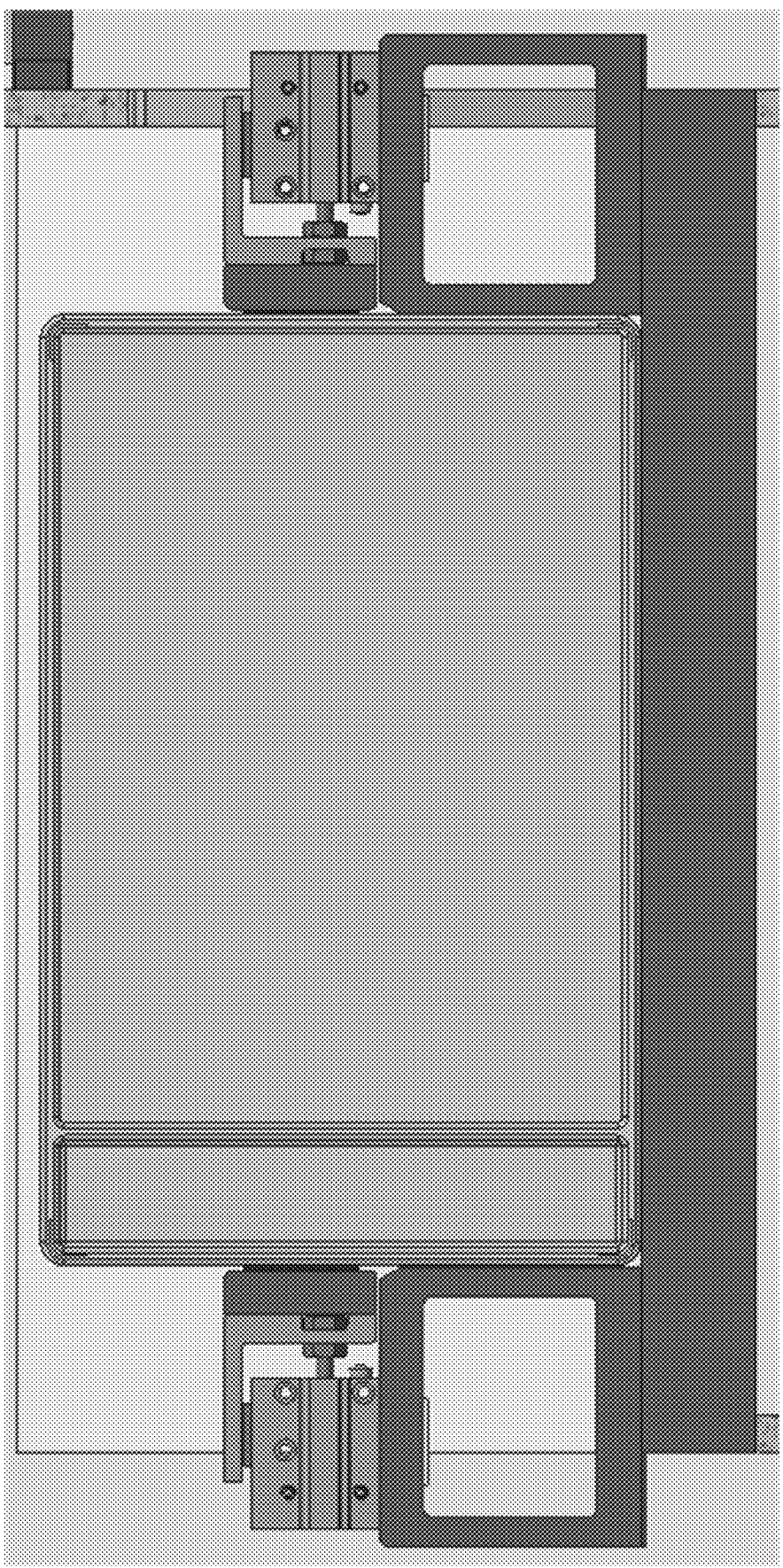

FIGS. 5A-B are CAD drawings showing two different embodiments of a holder with a clamping mechanism for holding a collectible in place for imaging both obverse and reverse sides simultaneously.

Figure 6A:
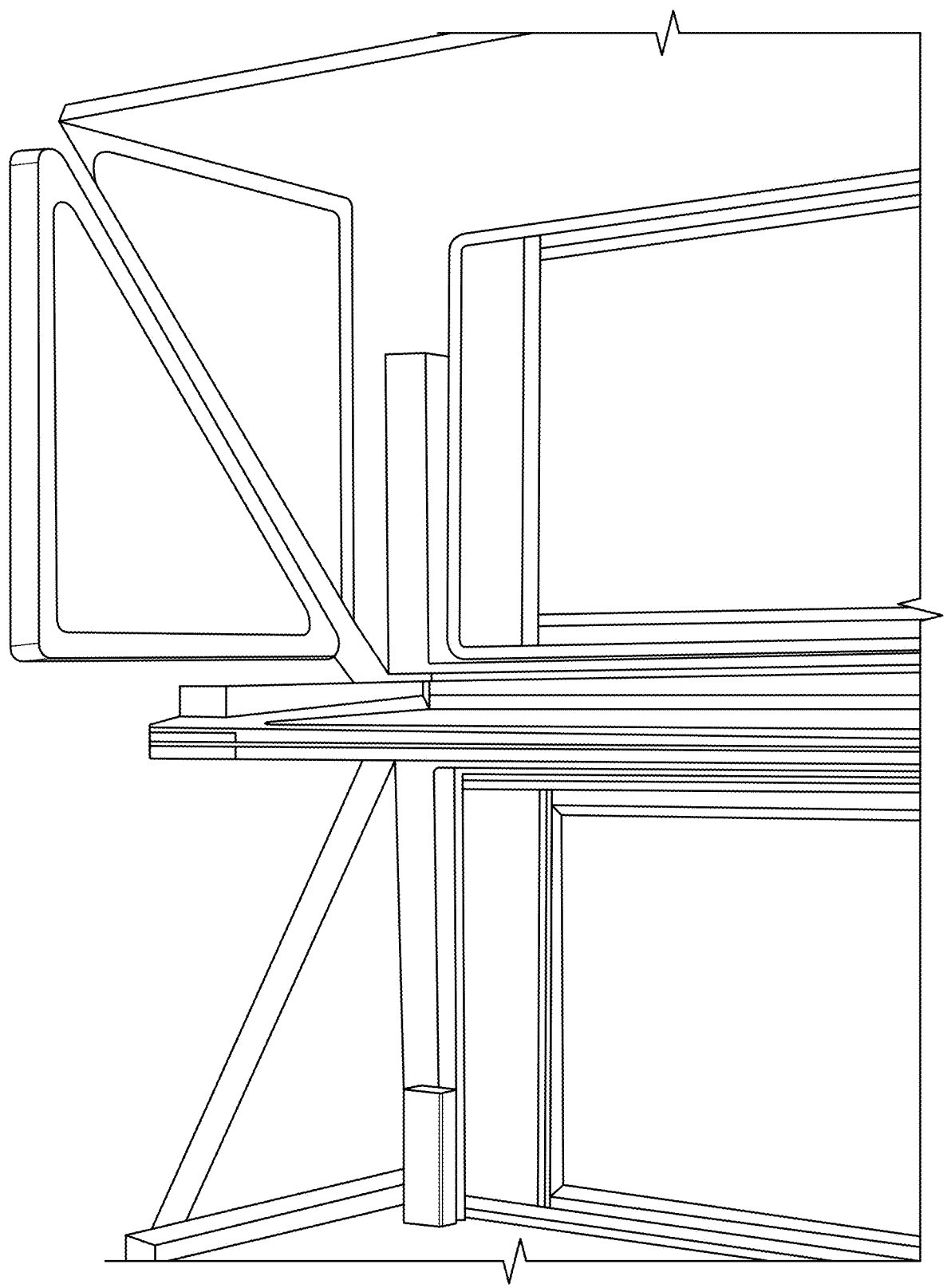
FIGS. 6A-E are line drawing reproductions of photographs taken of a triangularly shaped lighting device for illuminating a collectible during imaging.
Figure 6B:
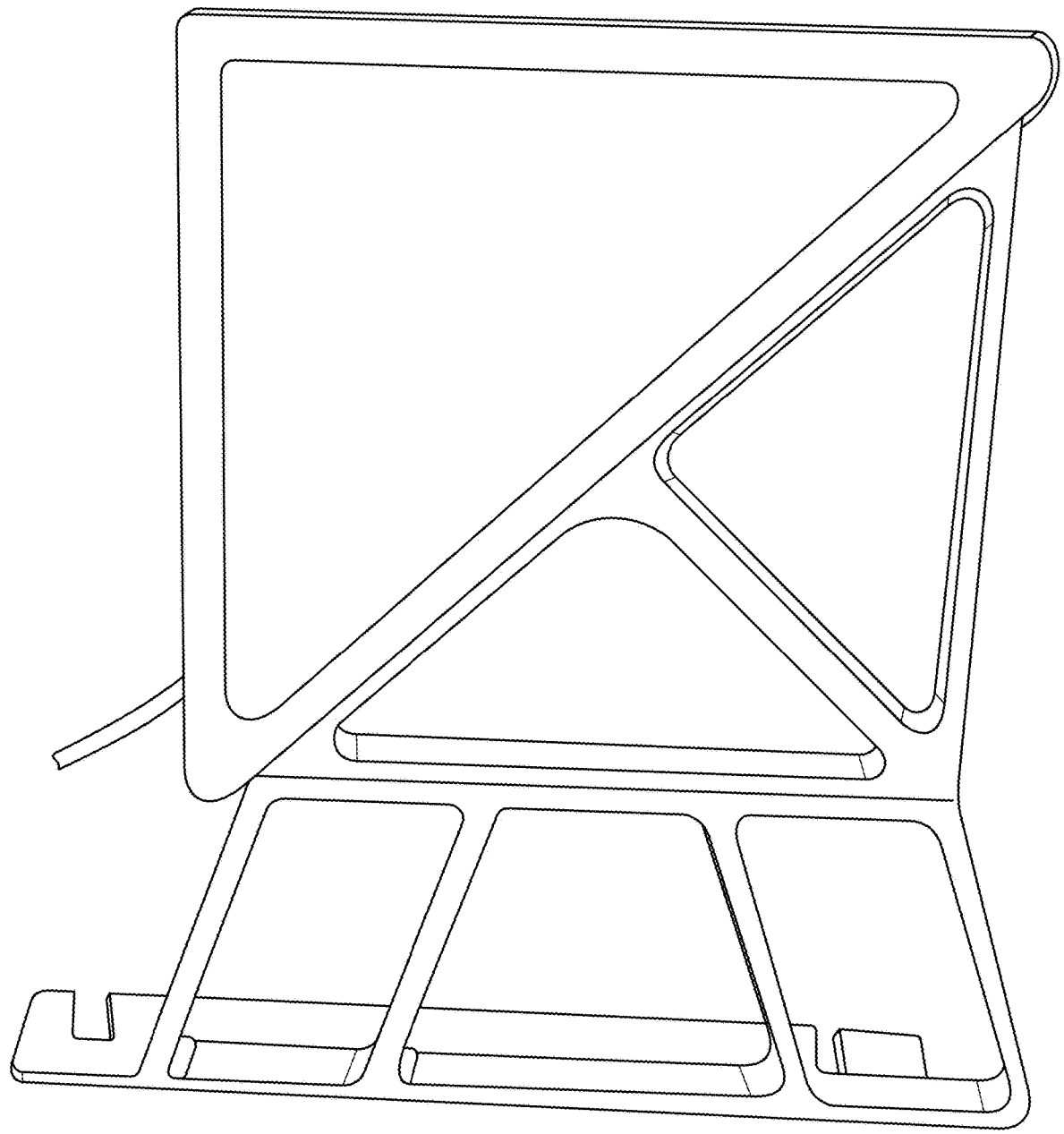
Figure 6C:
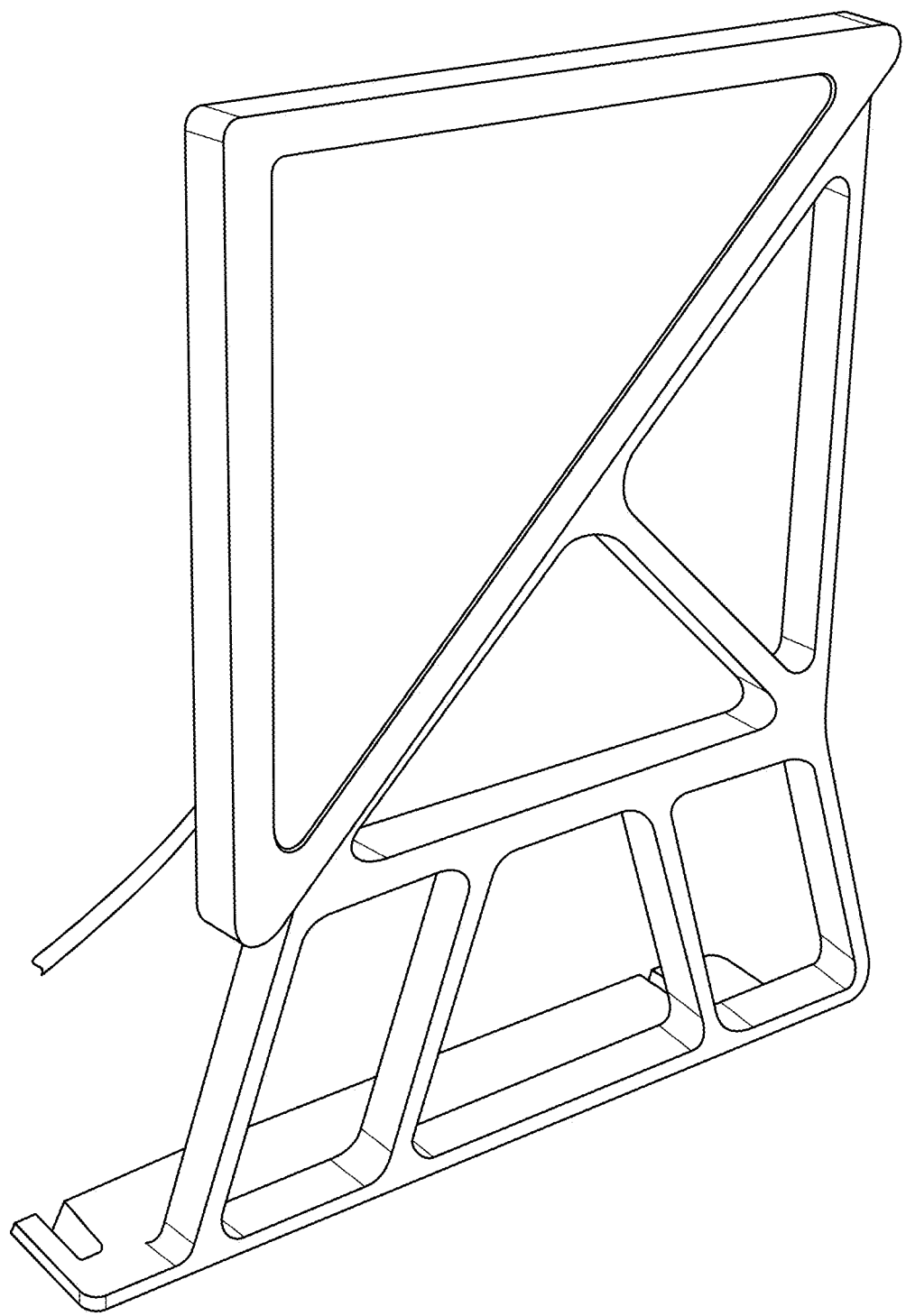
Figure 6D:
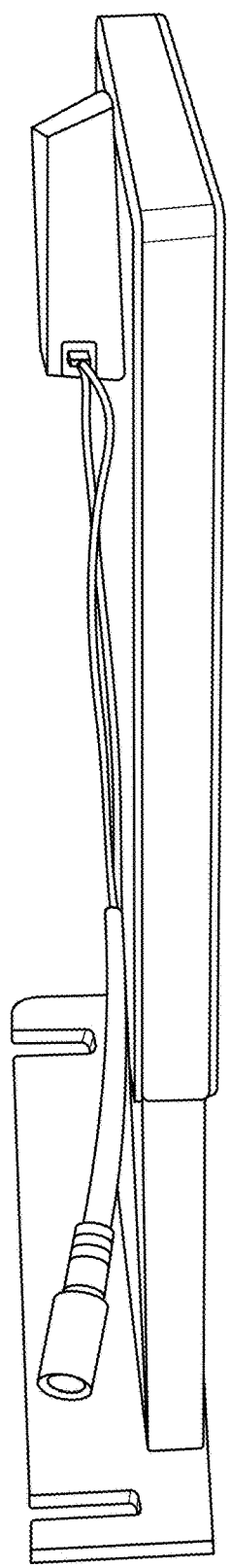
Figure 6E:
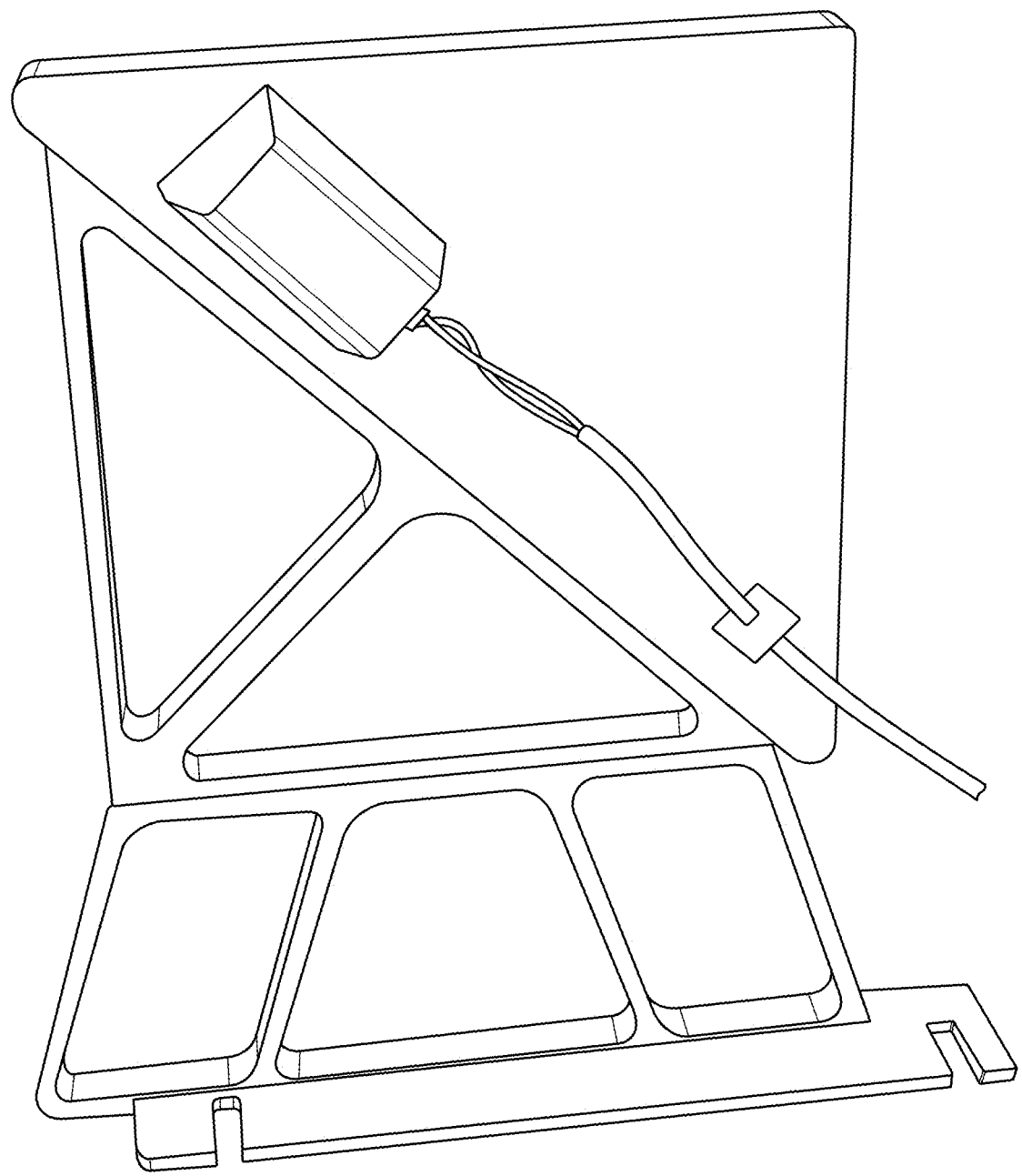

FIGS. 6A-E are line drawing reproductions of photographs taken of a triangularly shaped lighting device for illuminating a collectible during imaging. The original photographs, which provide more detail, can be found in the as-filed drawings in the patent application file history. FIG. 6A shows one such lighting device positioned adjacent to a test mirror assembly with a collectible held in place between the mirrors, and it should be noted that the depicted images of the front and back of the collectible in this drawing are shown as reflected through two mirrors. Although the illustrated lighting device is triangularly shaped, other shapes can be used. In one embodiment, the light source emits light that illuminates the collectible from no position that is closer to the camera than a closest part of the collectible. By keeping the light source at least as far away as the closest portion of the collectible, reflections from the light source by the mirrors into the camera can be reduced or eliminated.

Figure 7A:
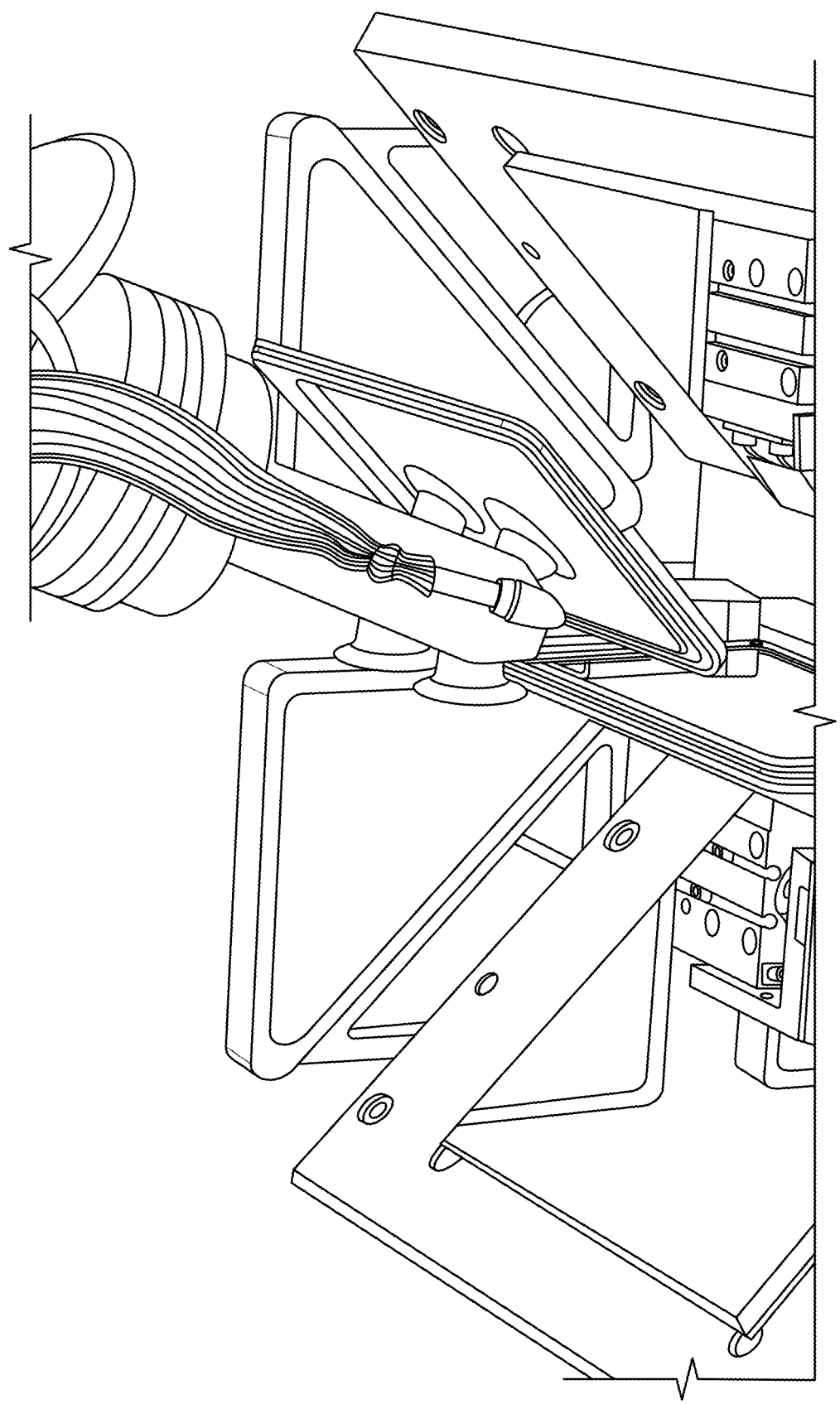
FIGS. 7A-C are line drawing reproductions of a sequence of three photographs of a system in accordance with one embodiment in operation.
Figure 7B:
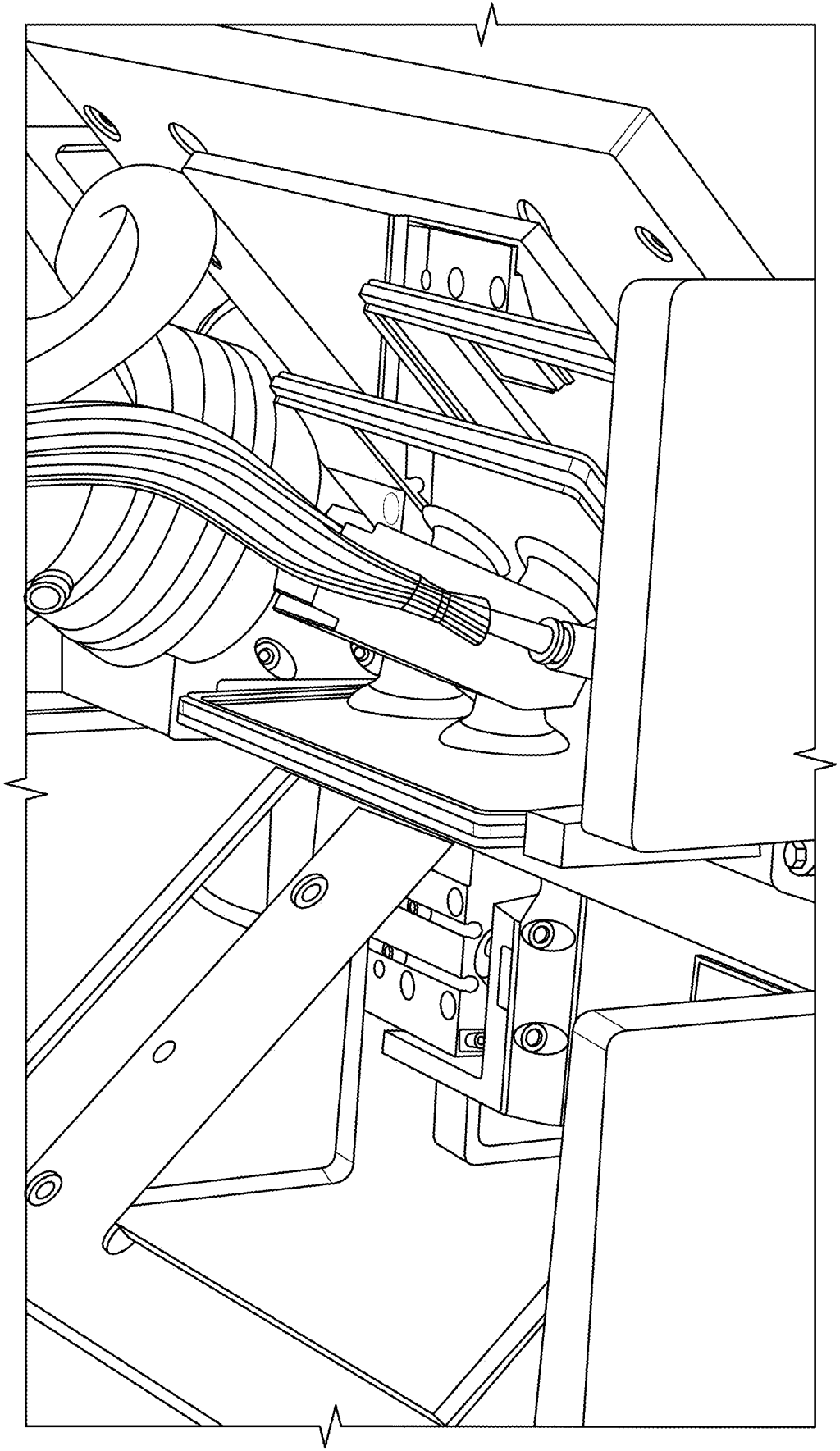
Figure 7C:
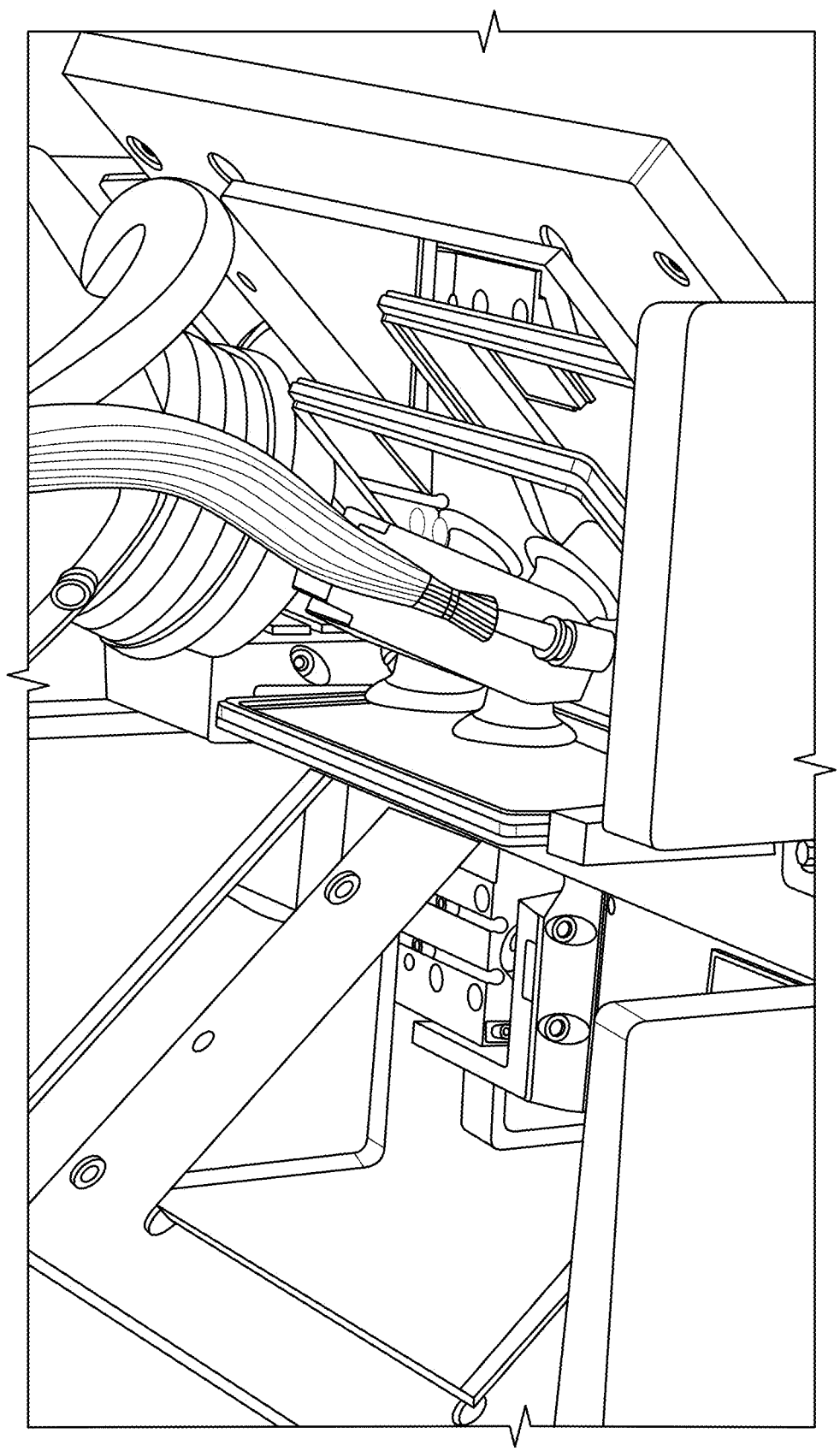

FIGS. 7A-C line drawing reproductions of a sequence of three photographs of a system in accordance with one embodiment in operation showing a robot arm with suction cups moving into place to remove a first previously photographed collectible from an imaging assembly. The original photographs, which provide more detail, can be found in the as-filed drawings in the patent application file history. The robot arm is also holding a second collectible item with an oppositionally disposed set of suction cups that will be placed in the assembly for imaging after the first collectible is removed.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 8:
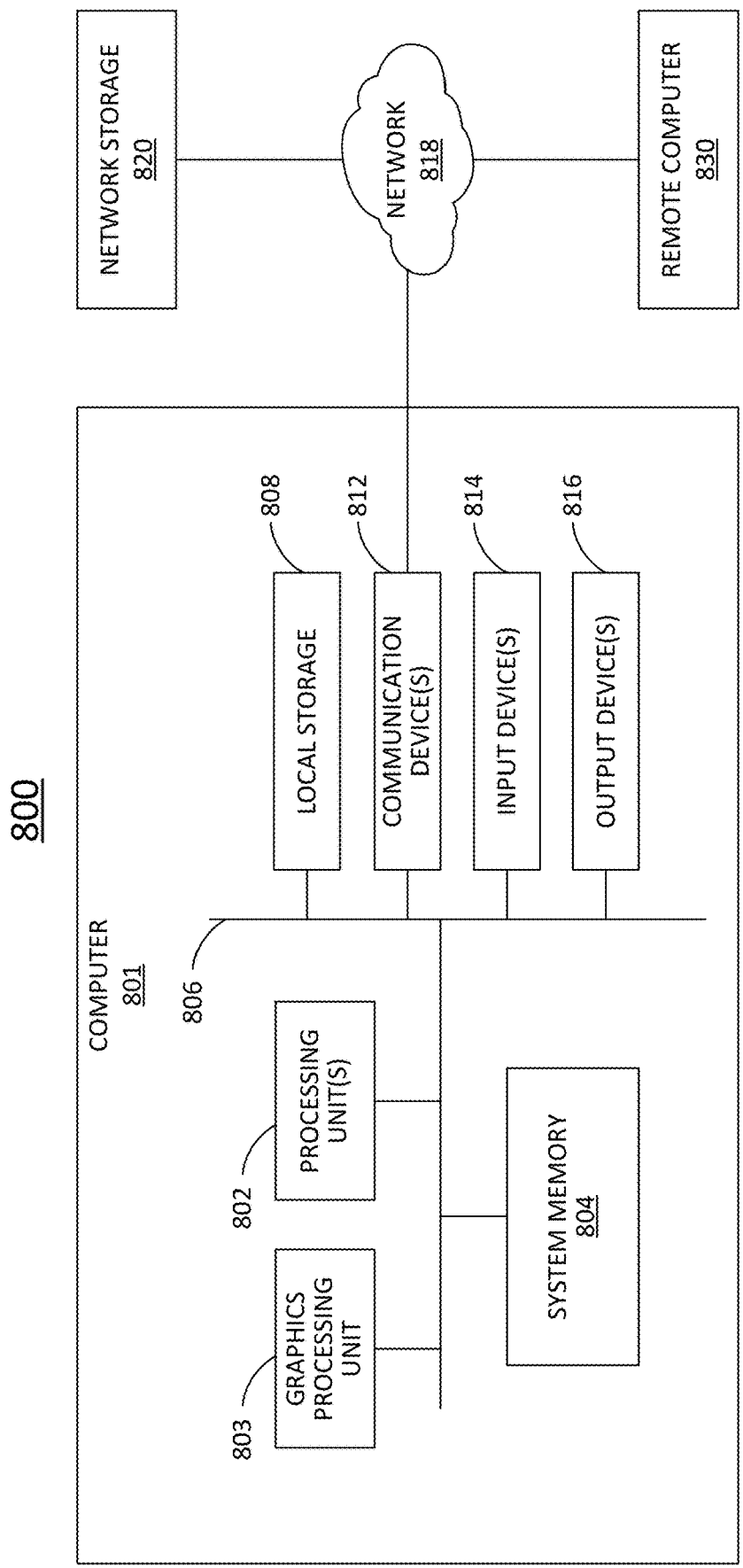
FIG. 8 illustrates a general computer architecture that can be appropriately configured to implement components disclosed in accordance with various embodiments.

FIG. 8 illustrates a general computer architecture 800 that can be appropriately configured to implement components disclosed in accordance with various embodiments. The computing architecture 800 can include various common computing elements, such as a computer 801, a network 818, and one or more remote computers 830. The embodiments disclosed herein, however, are not limited to implementation by the general computing architecture 800.

Referring to FIG. 8, the computer 801 can be any of a variety of general purpose computers such as, for example, a server, a desktop computer, a laptop computer, a tablet computer or a mobile computing device. The computer 801 can include a processing unit 802, a system memory 804 and a system bus 806.

The processing unit 802 can be or include one or more of any of various commercially available computer processors, which can each include one or more processing cores that can operate independently of each other. Additional co-processing units, such as a graphics processing unit 803, also can be present in the computer.

The system memory 804 can include volatile devices, such as dynamic random access memory (DRAM) or other random access memory devices. The system memory 804 can also or alternatively include non-volatile devices, such as a read-only memory or flash memory.

The computer 801 can include local non-volatile secondary storage 808 such as a disk drive, solid state disk, or removable memory card. The local storage 808 can include one or more removable and/or non-removable storage units. The local storage 808 can be used to store an operating system that initiates and manages various applications that execute on the computer. The local storage 808 can also be used to store special purpose software configured to implement the components of the embodiments disclosed herein and that can be executed as one or more applications under the operating system.

The computer 801 can also include communication device(s) 812 through which the computer communicates with other devices, such as one or more remote computers 830, over wired and/or wireless computer networks 818. Communications device(s) 812 can include, for example, a network interface for communicating data over a wired computer network. The communication device(s) 812 can include, for example, one or more radio transmitters for communications over Wi-Fi, Bluetooth, and/or mobile telephone networks.

The computer 801 can also access network storage 820 through the computer network 818. The network storage can include, for example, a network attached storage device located on a local network, or cloud-based storage hosted at one or more remote data centers. The operating system and/or special purpose software can alternatively be stored in the network storage 820.

The computer 801 can have various input device(s) 814 such as a keyboard, mouse, touchscreen, camera, microphone, accelerometer, thermometer, magnetometer, or any other sensor. Output device(s) 816 such as a display, speakers, printer, or eccentric rotating mass vibration motor can also be included.

The various storage 808, communication device(s) 812, output device(s) 816 and input device(s) 814 can be integrated within a housing of the computer, or can be connected through various input/output interface devices on the computer, in which case the reference numbers 808, 812, 814 and 816 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing. In method claims, any reference characters are used for convenience of description only, and do not indicate a particular order for performing a method.

The invention claimed is:

1. A system for simultaneously imaging opposing sides of a collectible item (collectible) for each of a plurality of collectibles, the system comprising:
   a frame;
   two plane mirrors, each plane mirror having a flat reflective surface, the two plane mirrors attached to the frame in a configuration that forms a 90-degree angle between the reflective surfaces of the two plane mirrors;
   a holder attached to the frame and configured to secure the collectible between the two plane mirrors, the collectible being substantially centered on a geometric plane extending along a bisection of the 90-degree angle, wherein each of the opposing sides of the collectible forms a reflection in one of the plane mirrors;
   a camera attached to the frame, the camera positioned with a field of view oriented towards the reflections formed in the two plane mirrors, the field of view being substantially centered within the geometric plane; and
   at least two substantially triangle-shaped diffused light sources attached to the frame and positioned to provide light through two substantially triangle-shaped openings bounded by the two mirrors.

2. The system of claim 1, wherein each of the at least two light sources is positioned to illuminate the collectible directly and by reflection off at least one of the mirrors.

3. The system of claim 2, wherein the number of light sources is four, and wherein each of the four light sources is positioned to provide light through one of four substantially triangle-shaped openings bounded by one of the mirrors and a side of the collectible.

4. The system of claim 2, wherein the at least two light sources are positioned no closer to the camera than a closest portion of the collectible being imaged.

5. The system of claim 1, further comprising:
   a computer controlled robotic arm having an end effector configured for picking and placing collectibles.

6. The system of claim 5, wherein the end effector comprises one or more actuatable suction cups.

7. The system of claim 6, wherein the end effector comprises two sets of suction cups, wherein a first set of suction cups is configured for holding a first collectible and a second set of suction cups is configured for holding a second collectible.

8. The system of claim 5, further comprising a conveyor from which collectibles are picked by the robotic arm for placement in the holder.

9. The system of claim 8, wherein the robotic arm is configured to pick imaged collectibles from the holder after imaging and replace the imaged collectibles on the conveyor.

10. The system of claim 1, wherein the holder comprises at least one pneumatically actuated clamping wall.

11. The system of claim 1, wherein the collectible is a cased collectible item comprising an item and a transparent plastic case enclosing the item.

12. The system of claim 1, further comprising a computer system comprising at least one processor and a memory storing instructions that cause the computer system to perform a method comprising:
   receiving an image captured by the camera;
   cropping from the image an obverse side image of the collectible;
   cropping from the image a reverse side image of the collectible;
   identifying the collectible based on a label on the collectible as captured within the image; and
   associating the cropped side images with the identification of the collectible.

13. A system for simultaneously imaging opposing sides of a collectible item (collectible) for each of a plurality of collectibles, the system comprising:
   a frame;
   two plane mirrors, each plane mirror having a flat reflective surface, the two plane mirrors attached to the frame in a configuration that forms a 90-degree angle between the reflective surfaces of the two plane mirrors;
   a holder attached to the frame and configured to secure the collectible between the two plane mirrors, the collectible being substantially centered on a geometric plane extending along a bisection of the 90-degree angle, wherein each of the opposing sides of the collectible forms a reflection in one of the plane mirrors;
   a camera attached to the frame, the camera positioned with a field of view oriented towards the reflections formed in the two plane mirrors, the field of view being substantially centered within the geometric plane; and
   at least two diffused light sources sized, shaped, and positioned to occupy most of two open areas defined by two triangle-shaped openings bounded by the two mirrors, wherein each of the at least two diffused light sources emits light from no position closer to the camera than a closest portion of the collectible being imaged.

14. The system of claim 13, wherein each of the at least two diffused light sources is triangularly shaped.

15. The system of claim 13, wherein the at least two diffused light sources are sized, shaped, and positioned to occupy a substantial majority of the two open areas defined by the two triangle-shaped openings bounded by the two mirrors.

16. The system of claim 13, wherein the number of light sources is four, and wherein each of the four light sources is sized, shaped, and positioned to provide light through one of four substantially triangle-shaped openings bounded by one of the mirrors and a side of the collectible.

17. The system of claim 16, wherein each of the four light sources is sized, shaped, and positioned to provide light through substantially all of one of the four substantially triangle-shaped openings bounded by one of the mirrors and a side of the collectible.

18. A system for simultaneously imaging opposing sides of a collectible item (collectible) for each of a plurality of collectibles, the system comprising:
   a frame;
   two plane mirrors, each plane mirror having a flat reflective surface, the two plane mirrors attached to the frame in a configuration that forms a 90-degree angle between the reflective surfaces of the two plane mirrors;
   a holder attached to the frame and configured to secure the collectible between the two plane mirrors, the collectible being substantially centered on a geometric plane extending along a bisection of the 90-degree angle, wherein each of the opposing sides of the collectible forms a reflection in one of the plane mirrors;
   a camera attached to the frame, the camera positioned with a field of view oriented towards the reflections formed in the two plane mirrors, the field of view being substantially centered within the geometric plane; and
   at least two diffused light sources positioned to provide light through a substantial majority of two triangle-shaped openings bounded by the two mirrors, wherein each of the at least two diffused light sources extends no closer to the camera than a closest portion of the collectible being imaged.

19. The system of claim 18, wherein each of the at least two diffused light sources is triangularly shaped.

20. The system of claim 18, wherein the number of light sources is four, and wherein each of the four light sources is sized, shaped, and positioned to provide light through substantially all of one of four substantially triangle-shaped openings bounded by one of the mirrors and a side of the collectible.

\* \* \* \* \*